United States Patent [19]

Ueda et al.

[11] Patent Number: 5,228,131

[45] Date of Patent: Jul. 13, 1993

[54] DATA PROCESSOR WITH SELECTIVELY ENABLED AND DISABLED BRANCH PREDICTION OPERATION

[75] Inventors: Tatsuya Ueda; Toyohiko Yoshida, both of Itami, Japan

[73] Assignee: Mitsubishi Denki Kabushiki Kaisha, Tokyo, Japan

[21] Appl. No.: 666,502

[22] Filed: Mar. 6, 1991

Related U.S. Application Data

[63] Continuation of Ser. No. 313,010, Feb. 17, 1989, abandoned.

[30] Foreign Application Priority Data

Feb. 24, 1988 [JP] Japan .................. 63-41086

[51] Int. Cl.⁵ .......................... G06F 9/38; G06F 9/32
[52] U.S. Cl. .......................... 395/375; 364/DIG. 1; 364/DIG. 2; 364/948.34; 364/938; 364/231.8; 364/261.3
[58] Field of Search ............... 395/DIG. 1, DIG. 2, 395/375

[56] References Cited

U.S. PATENT DOCUMENTS

| | | | |
|---|---|---|---|
| 4,477,872 | 10/1984 | Losq et al. | 364/200 |
| 4,760,520 | 7/1988 | Shintani et al. | 364/200 |
| 4,763,245 | 8/1988 | Emma et al. | 364/200 |
| 4,764,861 | 8/1988 | Shibuya | 364/200 |
| 4,777,594 | 10/1988 | Jones et al. | 364/200 |
| 4,827,402 | 5/1989 | Wada | 364/200 |
| 4,853,840 | 8/1989 | Shibuya | 364/DIG. 1 |
| 4,858,104 | 8/1989 | Matsuo et al. | 364/200 |

OTHER PUBLICATIONS

"Branch Prediction Strategies and Branch Target Buffer Design," Lee, et al, *Computer*, vol. 17, No. 1, Jan. 1984.

*Primary Examiner*—Robert B. Harrell
*Attorney, Agent, or Firm*—Townsend & Townsend

[57] ABSTRACT

The data processor related to the invention enables to designate whether the branch prediction mechanism itself should be activated or not for a conditional branch instruction, and the data processor enables to initialize branch history as required and also designates activation or inactivation of the branch prediction mechanism by setting a specific value to a specific bit of an exclusive usable register by software means. Also when a specific instruction is executed, the data processor automatically clears the branch history. As a result, in the event when the data processing efficiency is adversely declined by application of branch prediction mechanism or when monitoring external address bus, the branching prediction mechanism can be inactivated by setting the predetermined value to the exclusive usable register. Likewise, when the reliability of the branch history lowers due to such as variation in the program running condition, the data processor is capable of clearing the branch history by writing a specific value into the exclusive usable register, and when executing a specific instruction which varies the program executing condition, branch history is automatically cleared.

7 Claims, 8 Drawing Sheets

Fig. 8(a)

BBC REGISTER

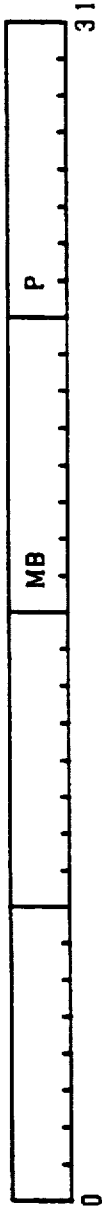

M=0  NOT TO OPERATE BRANCH PREDICTION MECHANISM (IT IS PREDICTED THAT WHOLE CONDITIONAL BRANCH INSTRUCTIONS DO NOT BRANCH)

M=1  TO OPERATE BRANCH PREDICTION MECHANISM (BRANCH PREDICTION FOR CONDITIONAL BRANCH INSTRUCTIONS IS EXECUTED BY BRANCH HISTORY)

B=0  NOT TO OPERATE OPERAND BYPASS MECHANISM

B=1  TO OPERATE OPERAND BYPASS MECHANISM

Fig. 8(b)

BBP REGISTER

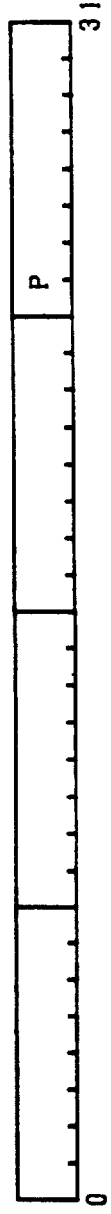

P=0  TO DESIGNATE NOT INITIALIZING BRANCH PREDICTION BIT

P=1  TO DESIGNATE INITIALIZING BRANCH PREDICTION BIT

DATA PROCESSOR WITH SELECTIVELY ENABLED AND DISABLED BRANCH PREDICTION OPERATION

This is a continuation of application Ser. No. 07/313,010, filed Feb. 17, 1989, now abandoned.

BACKGROUND OF THE INVENTION

1. Field of the invention

The present invention relates to a data processor, more particularly, to a data processor which has a branch instruction processing mechanism for executing branch prediction, especially branch prediction for conditional branch instruction, controlled disorder of a pipeline processing so that a multistage pipeline processing mechanism can effectively be operated, and realizes high capability of processing.

2. Description of the Prior Art

FIG. 1 is an example of schematic diagram of a pipeline processing mechanism used for a conventional data processor.

Reference numerals in the figure designate the following elements: 11, instruction fetch stage (IF stage); 12, instruction decoding stage (D stage); 13, operand address calculation stage (A stage); 14, operand fetch stage (F stage); and 15, instruction execution stage (E stage).

The IF stage 11 fetches instruction code from a memory and outputs it to the D stage 12. The D stage 12 decodes the instruction code received from the IF stage 11 and outputs a decoding result to the A stage 13.

The A stage 13 calculates an effective address of operand designated in the instruction code, and then outputs the calculated operand address to the F stage 14. In accordance with the operand address delivered from the A stage 13, the F stage 14 fetches an operand from memory. The fetched operand is delivered to E stage 15. The E stage 15 executes arithmetical operation designated by instruction code for the operand delivered from the F stage 14. It also stores the result of arithmetical operation in memory as required.

The pipeline processing mechanism mentioned above divides the processings designated by each instruction into five stages. By sequentially executing five-step processings, all the designated processing are completed. Each of five processings can be implemented in parallel with each other against different instructions. Ideally, compared to the case where no pipeline processing is executed, the five-stage pipeline processing mechanism mentioned above simultaneously processes five instructions so that an efficient data processor having a maximum of 5-times data processing capability can be provided.

As mentioned above, the pipeline processing mechanism has a possibility of greatly promoting data processing capability of data processors, and thus, is widely made available for achieving high-speed data processing operation.

Nevertheless, even the pipeline processing mechanism still has problems to solve. Actually, instructions are not always processed in ideal conditions. One of these critical problems is the method of executing branch instruction which easily disturbs the sequence of instructions.

The conventional data processor having the pipeline processing mechanism shown in FIG. 1 causes pipeline to be disturbed significantly when executing branch instructions by allowing the IF state 11 to fetch the branch target instruction.

FIG. 2 shows the state of instruction flows through pipeline when branch instructions are executed in the conventional data processor. In FIG. 2, instruction IN 3 and IN 12 are branch instructions. When instruction IN 3 is executed, whole instructions IN 4 through IN 7 under pipeline processing operation are canceled, and as a result, the IF stage 11 starts to process instruction IN 11. If this occurs, the time enough to process four instructions is wasted in the period from the execution of the instruction IN 3 via the E stage 15 to the execution of the instruction IN 11 by the E stage 15. Likewise, the time enough to process four instructions is wasted before executing the instruction IN 12. Only after completing all the pipeline processings for branch instruction, fetching of instruction to be processed after execution of branch instruction is executed by any conventional data processor, thus eventually resulting in the wasted time. The more the number of pipeline processing stages, the more the time being wasted.

To minimize disturbance incurring to pipeline by activation of branch instructions, any conventional data processor executes branch prediction processing by allowing the D stage 12 to predict the branching of conditional branch instruction at the time of decoding instructions and then shifts the destination of instruction to be fetched to the designated branch by means of the IF stage 11 before eventually allowing the E stage 15 to execute the conditional branch instruction.

When the operand to be prefetched by the F stage 14 corresponds to the other operand to be written by E stage 15, the F stage 14 does not prefetch operand from the memory, but it bypasses an operand value to be written by E stage 15, thus saving one time of operation for reading data from the memory.

Normally, efficiency in the pipeline processing operation is promoted by executing branch prediction which allows the decoding stage to predict branching of conditional branch instruction and then allows instruction fetch stage to shift the destination of instruction to be fetched to the designated branch target in advance.

However, when applying a application program in which branching is alternately activated and inactivated by conditional branch instruction, efficiency in the execution of instruction may adversely be affected by branch prediction.

When the entire system is reset or executing condition of program varies, since the branch prediction bit merely is decided by history of the program which was already executed, branch prediction is completely unreliable.

Furthermore, if an external address bus were monitored when monitoring operation of a microprocessor with an external pins of the chip for debugging, if the prediction of branching of the instruction branch prediction mechanism were missed, branching takes place once, which mislead the monitor system as though the operation is back to the original flow by causing branching to occur over again. This makes it difficult for the monitoring system to follow up the flow of instructions.

To solve those technical problems mentioned above, an improved art was proposed by Japanese Patent Application Laid-Open No. 59-183434 (1984). This preceding art has such a configuration that the programmer himself identifies the probability of achieving the branching effect of conditional branch instruction and programming is made to execute ON/OFF control of register for controlling preliminary acquisition of instruction for each instruction. When the register is activated, conditional branch instruction is processed on the assumption that it is supposed to be branched. When the register is inactivated, the conditional branching instruction is processed on the assumption that it is not branched. Nevertheless, the configuration mentioned above obliges programming to sustain extremely heavy load all the time.

SUMMARY OF THE INVENTION

The primary object of the invention is to fully overcome those technical problems mentioned above by providing the data processor having significantly higher data processing efficiency than any of conventional data processors.

The data processor related to the invention is provided with a constitution which specifies whether or not the branch prediction mechanism should be activated for conditional branch instruction, in addition, the data processor can initialize the branch history.

A specific value is set to the predetermined bit of an exclusive register with software for designating whether the branch prediction mechanism should be activated, or not. The data processor related to the invention causes the branch history of to automatically be cleared when executing a specific instruction.

With such a configuration, when the efficiency of data processing operation lowers itself by using branch prediction mechanism or when external address bus is monitored, branch prediction mechanism can be inactivated by setting a predetermined value to the control register. Also, if the reliability on the branch history lowers by variation of the program executing condition or the like, branch history can be cleared by writing a predetermined value into the control register. Likewise, branch history is automatically cleared when executing, for example, the instruction for context switch which may vary the program executing condition.

The above and further objects and features of the invention will more fully be apparent from the following detailed description with accompanying drawings.

BRIEF DESCRIPTION OF THE DRAWINGS

FIG. 8(a) is a schematic block diagram representing a content of a BBC register which is one of those control registers of the data processor related to the invention; and FIG. 8(b) is a schematic block diagram representing a content of a BBP register which is one of those control registers of the data processor related to the invention.

DESCRIPTION OF THE PREFERRED EMBODIMENTS

The preferred embodiment of the data processor of the invention will be described below with reference to the drawings.

(1) "Configuration of Function Block"

Figure 1:
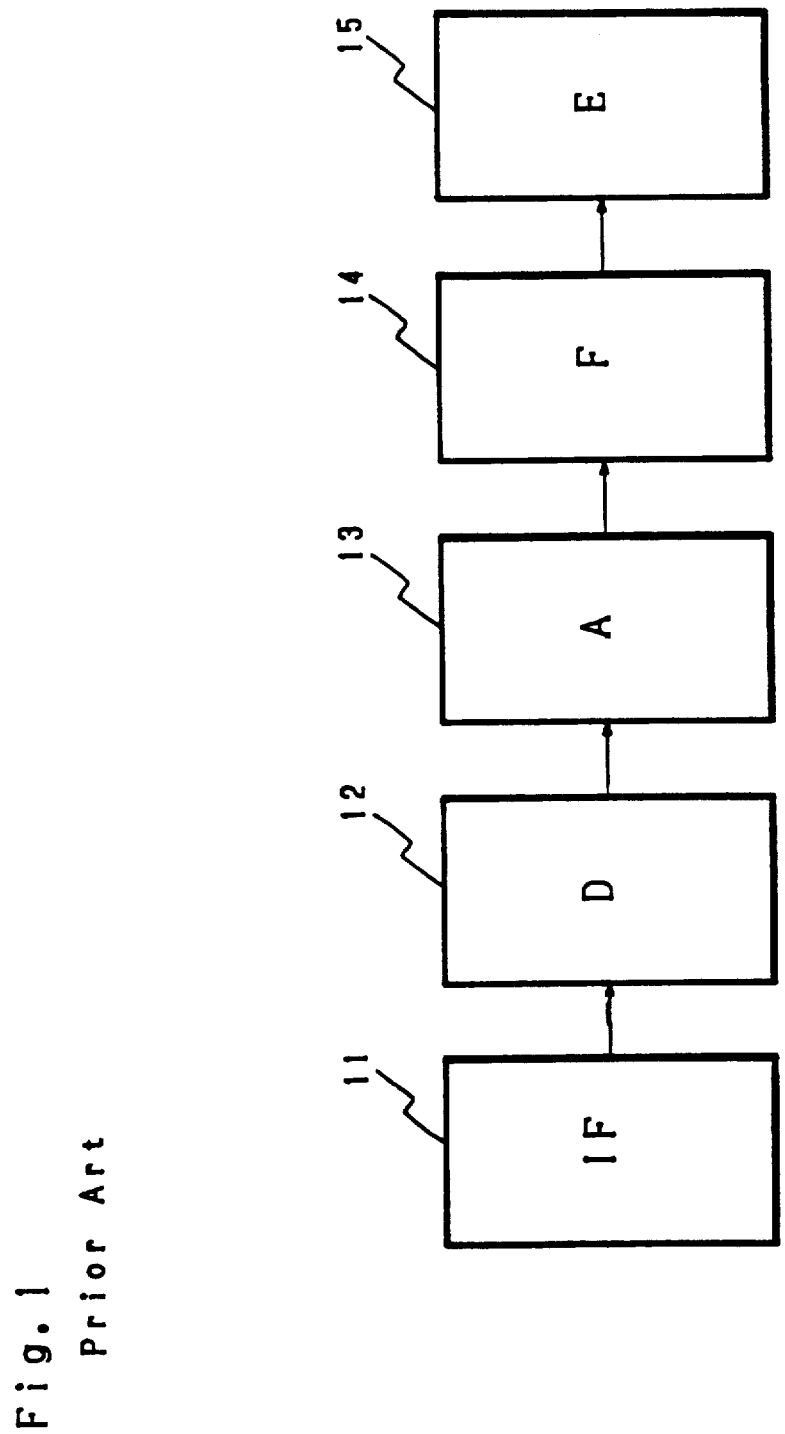
FIG. 1 is a simplified block diagram of the configuration of stages of a pipeline processing mechanism of a conventional data processor.
Figure 2:
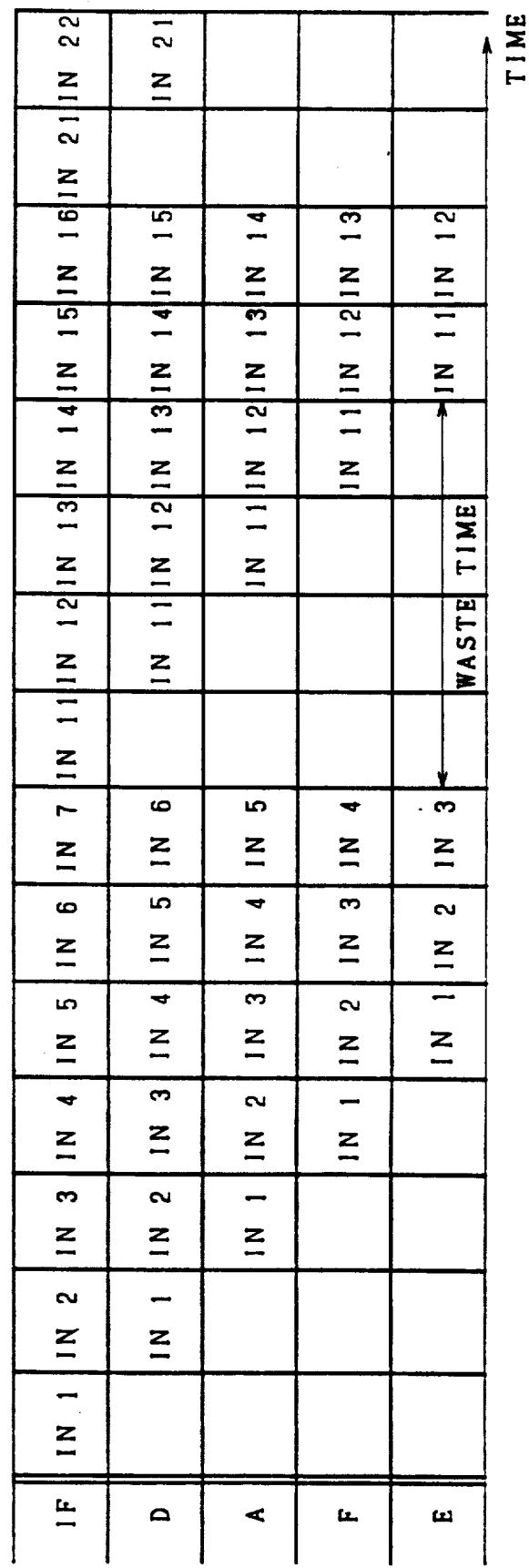
FIG. 2 is a schematic diagram representing condition how branch instructions are processed.
Figure 3:
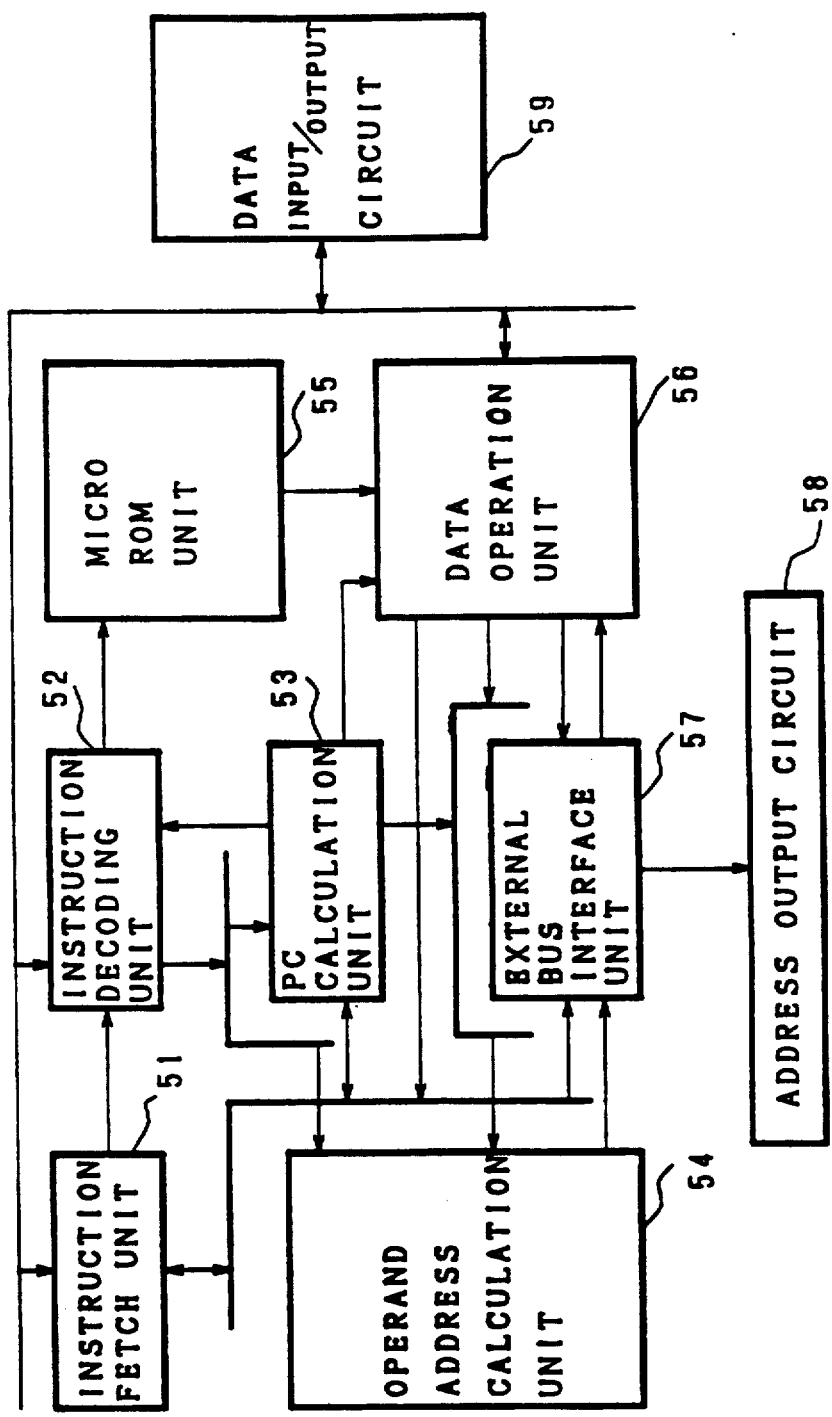
FIG. 3 is a simplified block diagram of an entire configuration of the data processor related to the invention.

FIG. 3 is a block diagram showing a configuration of the data processor of the present invention.

The interior of the data processor of the present invention is functionally divided roughly into an instruction fetch unit 51, an instruction decoding unit 52, a PC calculation unit 53, an operand address calculation unit 54, a micro ROM unit 55, a data operation unit 56 and external bus interface unit 57.

In FIG. 3, in addition to the above-described units, an address output circuit 58 for outputting address to the exterior of a CPU and a data input/output circuit 59 for inputting and outputting data from and to the exterior of the CPU are shown being separated from the other function block units.

(1.1) "Instruction Fetch Unit"

The instruction fetch unit 51 which comprises a branch buffer, an instruction queue and a controlling unit thereof, determines the address of an instruction to be fetched next and fetches the instruction from the branch buffer or a memory outside the CPU. It also performs instruction registering to the branch buffer.

The branch buffer is small-scaled, therefore operating as a selective cache.

Detailed description on the operation of the branch buffer is disclosed in the Japanese Patent Application Laid-Open No. 63-56731 (1988).

The address of an instruction to be fetched next is calculated by a dedicated counter as the address of the instruction to be inputted to an instruction queue 1. In the case where a branch or jump is generated, an address of a new instruction is transferred from the PC calculation unit 53 or the data operation unit 56.

In the case where an instruction is fetched from a memory outside the CPU, the address of the instruction to be fetched is outputted from the address output circuit 58 to the outside of the CPU through the external bus interface unit 57, and an instruction code is fetched from the data input/output circuit 59.

Then, among the instruction codes in buffering, the instruction code to be decoded nest is outputted to the instruction decoding unit 52.

(1.2) "Instruction Decoding Unit"

In the instruction decodings unit 52, basically an instruction code is decoded on a 16-bit (half word) basis. This block comprises a FHW decoder for decoding an operation code included in the first half word, a NFHW decoder for decoding an operation code including in the second and the third half words, and an addressing mode decoder for decoding an addressing mode. These FHW decoder, NFHW decoder and addressing mode decoder are generally called a first decoder.

There are also comprised a second decoder which further decodes an output of the FHW decoder or the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 52 decodes the instruction code being inputted from the instruction fetch unit 51 by 0-6 bytes per two clocks (one step). Among the results of decoding, information on operation in the data operation unit 56 is outputted to the micro ROM unit 55, information on operand address calculation is outputted to the operand address calculation unit 54, and information on PC calculation is outputted to the PC calculation unit 53, respectively.

(1.3) "Micro ROM Unit"

The micro ROM unit 55 comprises a micro ROM for storing microprograms mainly controlling the data operation unit 56, a micro sequencer, and a micro instruction decoder. A micro instruction is read out from the micro ROM once per two clocks (one step). The micro sequencer accepts processings of exception, interruption and trap (these three are generally called EIT) in a hardware manner in addition to the sequential processings shown by the microprograms. The micro ROM unit 55 also controls a store buffer. To the micro ROM unit 55, there are inputted flag information generated by interruption independent of the instruction code or by the result of operation execution, and output of an instruction decoding unit such as output of a second decoder 3. Output of the micro decoder is performed mainly to the data operation unit 56, but some information such as information of stopping other preceding processing due to execution of a jump instruction is outputted also to other blocks.

(1.4) "Operand Address Calculation Unit"

The operand address calculation unit 54 is controlled in a hardwired manner by information on operand address calculation outputted from the address decoder of the instruction decoding unit 52 or the like. In this block, substantially all of processings on operand address calculation are performed. Checking is made for whether or not the address of memory access for memory indirect addressing and the operand address can be entered in an I/O area mapped in the memory.

The result of address calculation is sent to the external bus interface unit 57. The values of the general-purpose register and the program counter required for address calculation are inputted from the data operation unit.

In performing the memory indirect addressing, the memory address to be referred is outputted from the address output circuit 58 to the outside of the CPU through the external bus interface unit 57, and the indirect address value inputted from the data input/output unit 59 is fetched through the instruction decoding unit 52.

(1.5) "PC Calculation Unit"

The PC calculation unit 53 is controlled in a hardwired manner by information on PC calculation outputted from the instruction decoding unit 52, and calculates the PC value of an instruction. The data processor of the present invention has a variable-length instruction set, and the length of that instruction can be found only after the instruction is decoded. For this reason, the PC calculation unit 53 generates the PC value of the next instruction by adding the length of the instruction outputted from the instruction decoding unit 52 to the PC value of the instruction in decoding. In the case where the instruction decoding unit 52 decodes a branch instruction and directs a branch in the decoding stage, the PC value of a branch destination instruction is calculated by adding a branch displacement in place of the instruction length to the PC value of the branch instruction. In the data processor of the present invention, performing a branch in the instruction decoding stage in response to the branch instruction is called pre-branch.

On this pre-branch approach, detailed description is disclosed in the Japanese Patent Application Laid-Open No. 63-59630 (1988) and the Japanese Patent Application Laid-Open No. 63-55639 (1988).

The result of calculation in the PC calculation unit 53 is outputted as the PC value of each instruction together with the result of decoding of the instruction, and in addition, is outputted to the instruction fetch unit 51 as the address of the instruction to be decoded next at pre-branch. Also, it is used for the address for branch prediction of the instruction to be decoded next in the instruction decoding unit 52.

On the branch predicting approach, detailed description is disclosed in the Japanese Patent Application Laid-Open No. 63-175934 (1988).

(1.6) "Data Operation Unit"

The data operation unit 106 is controlled by microprograms, and executes the operation required for realizing the function of each instruction by means of registers and an arithmetic unit according to output information of the micro ROM unit 55. In the case where the operand to be operated is an address or an immediate value, the address or the immediate value calculated in the operand address calculation unit 54 is obtained by passing it through the external bus interface unit 57. In the case where the operand to be operated is in a memory outside the CPU, the bus interface unit outputs the address calculated in the address calculation unit 54 from the address output circuit 58, and the operand fetched from the memory outside the CPU is obtained from the data input/output circuit 59.

Arithmetic units include an ALU, a barrel shifter, a priority encoder or a counter, and a shift register. The registers and the main arithmetic units are connected through three buses, and one micro instruction for directing operation between registers is processed in two clocks (one step).

In the case where an access to the memory outside the CPU is required at the data operation, the address is outputted from the address output circuit 58 to the outside of the CPU through the external bus interface unit 57 by the direction of the microprogram, and the aimed data is fetched through the data input/output circuit 59.

In the case where data is read from the memory outside the CPU, the address is set in the AA1 register 76 and is outputted from the address output circuit 58 through the external bus interface unit 57, and simultaneously the data is transferred from the data input/output circuit 59 via the DD bus 108 and inputted into the DDR1 register 77.

In the case where data is stored in the memory outside the CPU, the address is set in the AA1 register 76 and is outputted from the address output circuit 58 through the external bus interface unit 57, and simultaneously the data set in the DDR2 register 78 is outputted from the data input/output circuit 59 to the outside of the CPU through the DD bus 108.

In the case where the data operation unit 56 obtains a new instruction address by processing a jump instruction or an exceptional processing, this is outputted to the instruction fetch unit 51 and the PC calculation unit 53.

(1.7) "External Bus Interface Unit"

The external bus interface unit 57 controls communication through the external bus of the data processor of the present invention. All accesses to memories are performed in a clock-synchronized manner, and can be performed in a minimum of two clock cycles (one step).

Access requests to memories are generated independently from the instruction fetch unit 51, the operand address calculation unit 54 and the data operation unit 56. The external bus interface unit 57 mediates these memory access requests. Furthermore, the access to the data located at the memory address striding over the alignment boundary of 32 bits (one word) which is the size of the data bus connecting the memory to the CPU is performed in a manner that striding over the word boundary is automatically detected in this block and the access is decomposed into memory accesses of two times.

This unit also performs conflict preventing processing and by-pass processing from the store operand to the fetch operand in the case where the operand to be pre-fetched and the operand to be stored are superposed.

In the case where access is required from the instruction fetch unit 51, the address is sent in the CAA register 142. In the case where access is required from the address calculation unit 54, the data is set in the IA register 126. In the case where access is required from the data operation unit 56, the address is set in the AA1 register 76.

In the case where access for prefetching operand, the address set in the FA register 127 is outputted to the AA bus 107, so that the operand data is fetched from the memory outside of the CPU. The fetched operand data is inputted into the SDATA 80 through the DD bus 108. The address used for access and kept in the AA bus 107 is inputted into the SCAM 79. The SCAM 79 and the SDATA 80 are connected with each other by an identity designating line 90. The SDATA 80 can store aligned data of 4 bytes to two data. The SCAM 79 stores address corresponding to the data in the SCAM 79. Data is inputted into the SDATA 80 by being aligned. On the other hand, when the data calculation unit 56 uses the data in the SDATA 80, data from arbitrary address and by arbitrary data length (within 4 bytes) can be fetched.

(2) "Pipeline Processing Mechanism"

Figure 4:
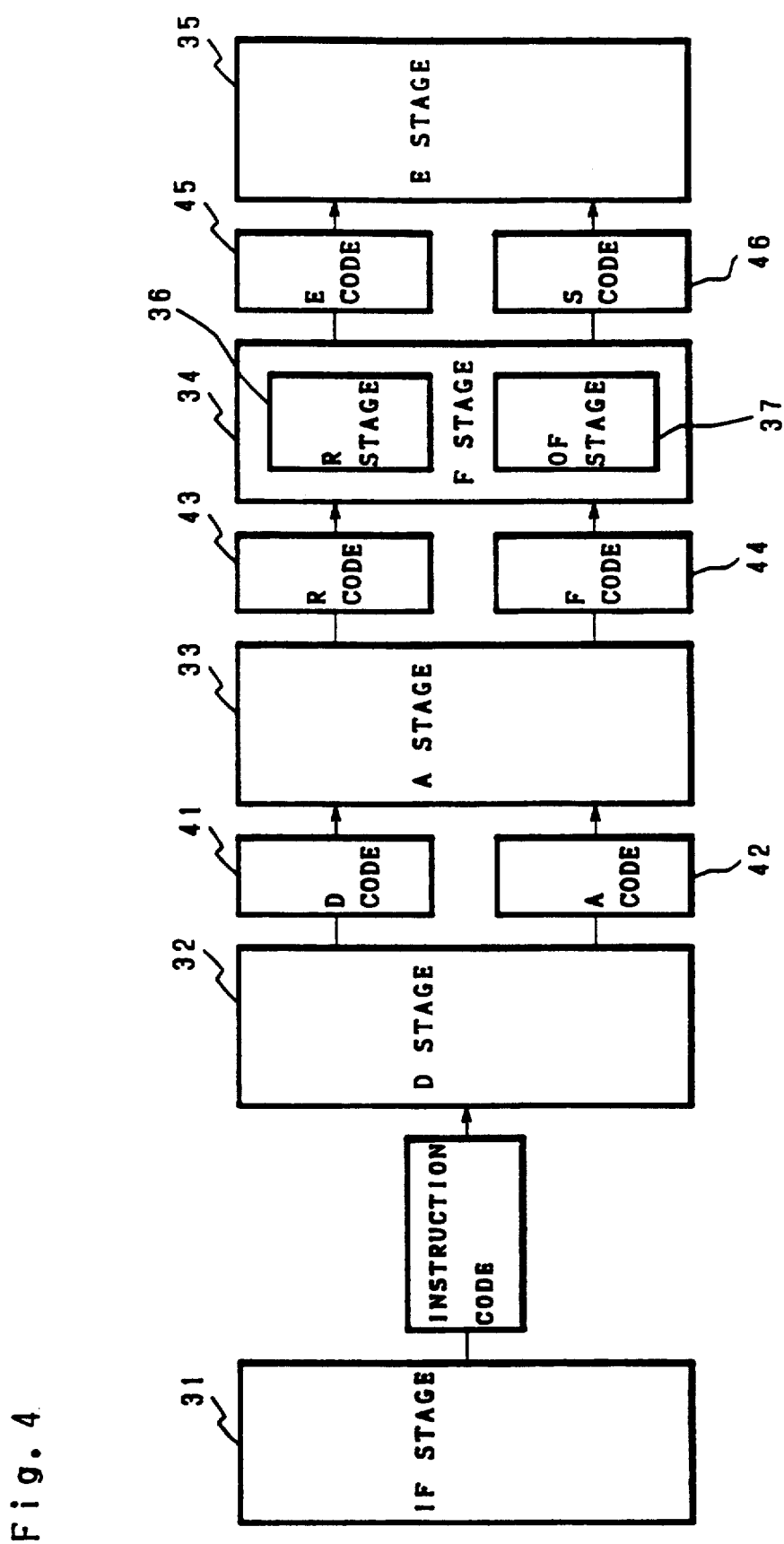
FIG. 4 is a simplified block diagram of stages of pipeline processing mechanism of the data processor related to the invention.

FIG. 4 is a schematic diagram showing a pipeline processing mechanism of the data processor of the present invention.

The basis of pipeline processing has a five-stage configuration which comprises an instruction fetch stage (IF stage) 31 for prefetching an instruction, a decoding stage (D stage) 32 for decoding the instruction, an operand address calculation stage (A stage) 33 for performing address calculation of an operand, an operand fetch stage (F stage) 34 consisting of a portion for performing micro ROM access (particularly called a R stage 36) and a portion for prefetch an operand (particularly called an OF stage 37), and an execution stage (E stage) 60 35 for executing an instruction.

The E stage 35 comprises a one-stage store buffer, and besides, in part of high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clocks (one step). Accordingly, ideally, the pipeline processing progresses one after another on a two clock (one step) basis.

The data processor of the present invention comprises some instructions which cannot be processed only by the basic pipeline processing of one time such as an operation between memory and memory or a memory indirect addressing, but the data processor of the present invention is designed in such a manner that a balanced pipeline processing can be performed whenever possible for processing of these instructions. For the instruction having a plurality of memory operands, the pipeline processing is performed based on the number of memory operands by decomposing it into a plurality of pipeline processing units (step code) at the decoding stage.

On the decomposing method of the pipeline processing unit, detailed description is disclosed in the Japanese Patent Application Laid-Open No. 63-89932 (1988).

Information transferred from the IF stage 31 to the D stage 32 is an instruction code itself. Information transferred from the D stage 32 to the A stage 33 includes two kinds of information, one on operation designated by an instruction (called a D code 41) and the other on address calculation of operand (called an A code 42).

Information transferred from the A stage 33 to the F stage 34 includes an R code 43 comprising an entry address of a microprogram or a parameter of the microprogram and an F code 44 comprising an operand address and information on directing the method of access.

Information transferred from the F stage 34 to the E stage 35 includes an E code 45 comprising operation control information and literal and an S code 46 comprising an operand or an operand address.

EIT detected in the stage other than the E stage 35 does not start the EIT processing until the code thereof reaches the E stage 35. This is because only the instruction processed in the E stage 35 is an instruction at the execution stage, and the instructions having been processed between the IF stage 31 and the F stage 34 do not reach the execution stage yet. Accordingly, for the EIT detected in the stage other than the E stage 35, the detection thereof is recorded in the step code, and it is only transmitted to the following stage.

(2.1) "Pipeline Processing Unit"

Figure 6:
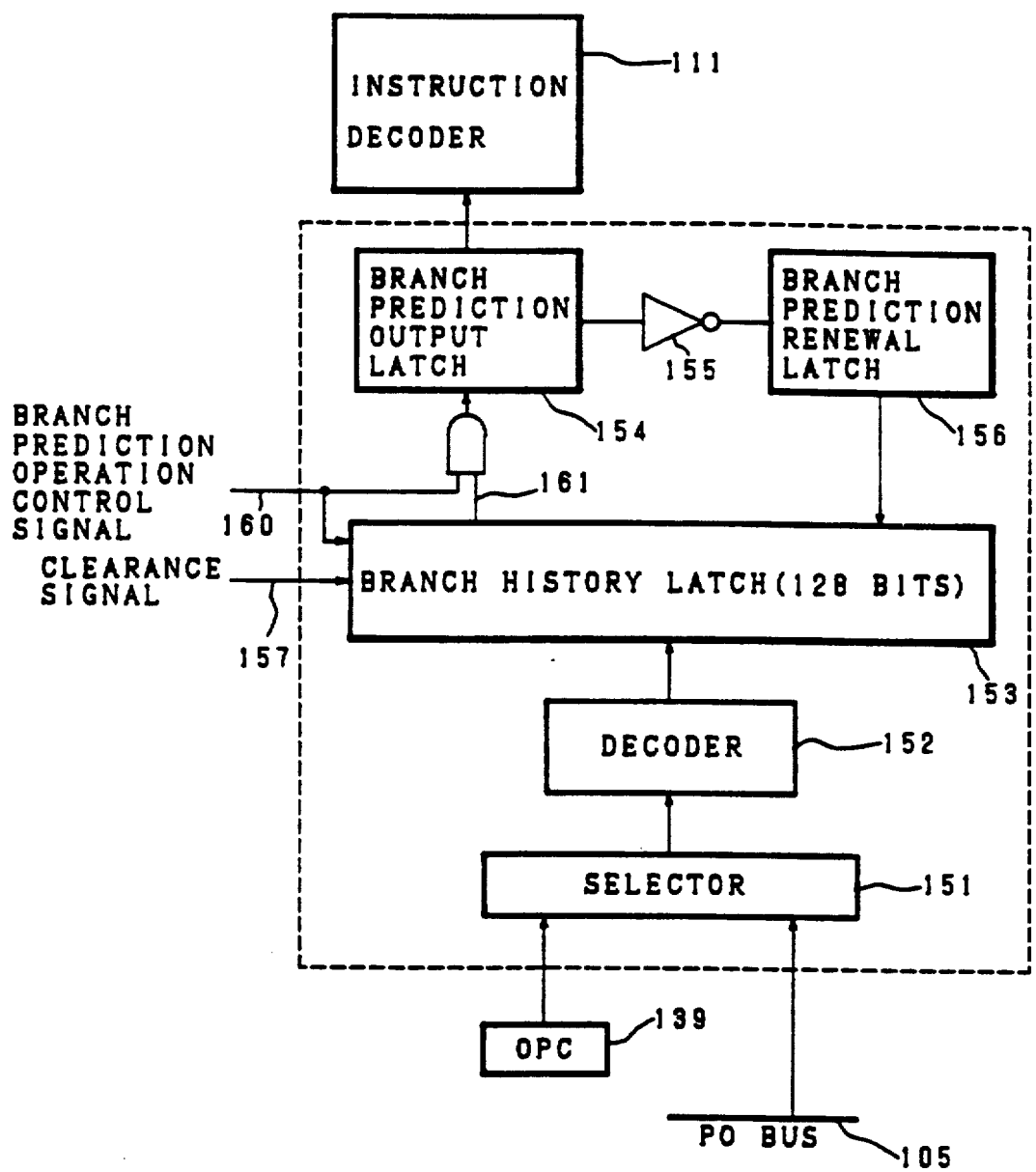
FIG. 6 is a simplified block diagram of an instruction branch prediction mechanism related to the invention.

FIG. 6 is a schematic diagram showing the feature of the basic instruction format of the data processor of the present invention. In FIG. 6, 31 is the IF stage, 32 is the D stage, 33 is the A stage, 34 is the F stage, 35 is the E stage, 36 is the R stage and 37 is the OF stage.

(2.1.1.) "Decomposition of Instruction into Step Codes"

The data processor of the present invention performs the pipeline processing making the most of the feature of the above-mentioned instruction format.

In the D stage 32, "a two-byte instruction base part + an addressing extension part of 0 to 4 bytes", "a chained addressing mode designating part + an addressing extension part", or an extension part peculiar to the instruction is processed as one decoding unit. The result of decoding of each time is called a step code, and in and after the A stage 33, this step code is taken as a unit of pipeline processing. The number of step codes is peculiar to each instruction, and in the case where the chained addressing mode designating is not performed, one instruction is divided into a minimum of one step code to a maximum of three step codes. In the case where the chained addressing mode designating is performed, the number of step codes is increased by a number as required. Note that this is performed only in the decoding step as described later.

(2.1.2) "Control of Program Counter"

All of the step codes existing on the pipeline of the data processor of the present invention have a possibility of being the ones for another instruction, and for this reason, the value of the program counter is controlled on a step code basis. All of the step codes have the program counter value of the instruction whereon that step code is based. The program counter value flowing through each stage of the pipeline while accompanying the step code is called a step program counter (SPC). The SPC is transferred sequentially from one pipeline stage to the other.

(2.2) "Processing of Each Pipeline Stage"

As shown in FIG. 6, for convenience sake, names are given to the input and output step codes of each pipeline stage. The step codes perform processing relating to the operation codes, and include two series; a series becoming entry addresses of microprograms and parameters for the E stage 35 and a series becoming operands for microinstructions of the E stage 35.

(2.2.1) "Instruction Fetch Stage"

The instruction fetch stage (IF stage) 31 fetches an instruction from the memory or the branch buffer and input it to the instruction queue 1, and outputs an instruction code to the D stage 32. Input of the instruction queue 1 is performed in an aligned four-byte unit. In the case where an instruction is fetched from the memory, a minimum of two clocks (one step) are required for the aligned four bytes. In the case where the branch buffer hits, fetching can be made in one clock per aligned four bytes. The output unit of the instruction queue 1 is variable on a two-byte basis, and a maximum of six bytes can be outputted during two clocks. Immediately after a branch, two bytes of the instruction base part can also be transferred directly to the instruction decoder by by-passing the instruction queue 1.

Control of registering, clearing and the like of the instruction to the branch buffer, management of addresses of the instructions to be prefetched and control of the instruction queue are also performed in the IF stage 31.

The EITs detected in the IF stage 31 include a bus access exception in fetching an instruction from the memory or an address conversion exception due to memory protection violation.

(2.2.2) "Instruction Decoding Stage"

The instruction decoding stage (D stage) 32 decodes an instruction code inputted from the IF stage 31. Decoding is performed by two clock (one step) basis using the first decoder 2 consisting of the FHW decoder, the NFHW decoder and the addressing mode decoder in the instruction decoding unit 52, and an instruction code of 0 to 6 bytes is consumed in the decoding processing of one time (no instruction code is consumed in the outputting processing of the step code comprising the return address of the RET instruction). By onetime decoding, the control code which is the A code 42 as address calculation information, address modification information, the control code which is the D code 41 as the result of intermediate decoding of the operation code, and eight-bit literal information are inputted to the A stage 33.

In the D stage 32, control of the PC calculation unit 53 of each instruction, branch prediction processing, prebranch processing for the prebranch instruction and outputting processing of the instruction code from the instruction queue 1 are also performed.

The EITs detected in the D stage 32 include a reserve instruction exception and an odd address jump trap at prebranch. Various EITs transferred from the IF stage 31 are also transferred to the A stage 33 through processing of encoding into the step code.

(2.2.3) "Operand Address Calculation Stage"

Processing functions of the operand address calculation stage (A stage) 33 are roughly divided into two parts. One is processing for post-stage decoding of the operation code using the second decoder 3 of the instruction decoding unit 52 and the other is for calculation of operand address in the operand address calculation unit 54.

The post-stage decoding processing of the operation code inputs the D code 41 and outputs the R code 43 comprising write reserve of register and memory, entry address of microprogram and parameters for microprogram. In addition, the write reserve of the register or memory is for preventing a wrong address calculation by re-writing the content of the register or memory referred in the address calculation with the instruction preceding on the pipeline.

To avoid a dead lock the write reserve of the register or memory is performed on an instruction basis rather than on a step code basis.

On the write reserve to the register or memory, detailed description is disclosed in the Japanese Patent Application No. 62-144394 (1987).

The operand address calculation processing inputs the A code 42, performs addition in the operand address calculation unit 54 according to the A code 42 or performs address calculation by combining memory indirect reference, and outputs the result of the calculation as the F cord 44. At this time, conflict check is done in reading-out of the register and the memory attending on the address calculation, and if a conflict is indicated because the preceding instruction has not completed the writing processing to the register or the memory, the processing waits until the preceding instruction completes the write processing in the E stage 35. Checking is made for whether or not the operand address and the address of memory indirect reference can enter the I/O area mapped in the memory.

The EITs detected in the A stage 33 include reserve instruction exception, privilege instruction exception, bus access exception, address conversion exception and debugging trap generated by an operand break point hit at memory indirect addressing. When it is indicated that the D code 41 or the A code 42 itself has caused EIT, the A stage 33 does not perform address calculation processing for that code, and that EI is transmitted to the R code 43 and the F code 44.

(2.2.4) "Micro ROM Access Stage"

Processing of the operand fetch stage (F stage) 34 is also divided roughly into two parts. One is access processing of the micro ROM, particularly called the R stage 36. The other is operand prefetch processing, particularly called the OF stage 37. The R stage 36 and the OF stage 37, which do not necessarily operate at the same time, operate independently depending on whether or not the memory access right can be acquired.

The micro ROM access processing which is the processing of the R stage 36 is the micro ROM access and micro instruction decoding processing for generating the E code 45 which is an execute control code used for execution in the following E stage 35 for the R code 43. In the case where processing for one R code 43 is decomposed into two or more microprogram steps, the micro ROM is used in the E stage 35, and the following R code 43 waits for micro ROM access. The micro ROM access to the R code 43 is performed when the last micro instruction is executed in the preceding E stage 35. In the data processor of the present invention, almost all of the basic instructions are executed in one microprogram step, therefore, there are many actual cases that the micro ROM access to the R code 43 is performed one after another.

There is no EIT to be detected anew in the R stage 36.

When the R code 43 indicates the EIT of instruction processing re-execution type, the microprogram for that EIT processing is executed, and therefore the R stage 36 fetches the micro instruction according to the R code 43. In case where the R code 43 specifies an odd address jump trap, the R stage 36 transmits it through the E code 45. This is for prebranch, and in the E stage 35, if no branch is made in that E code 45, an odd address jump trap is generated with the prebranch being to be effective.

(2.2.5) "Operand Fetch Stage"

The operand fetch stage (OF stage) 37 performs the operand prefetch processing among the above-mentioned two processings performed in the F stage 34.

The operand prefetch processing inputs the F code 44 and outputs the fetched operand and the address thereof as the S code 36. One F code 44 may stride over the word boundary, but designates operand fetching of four bytes or less. The F code 44 also comprises designating of whether or not access to the operand is to be performed, and in the case where the operand address itself or the immediate value calculated in the A stage 33 is transferred to the E stage 35, no operand prefetch is performed, and the content of the F code 44 is transferred as the S code 46. In the case where the operand intended to be prefetched coincides with the operand intended to be write-processed in the E stage 35, no operand prefetching is performed from the memory, but being performed by by-passing it. For the I/O area, the operand prefetch is delayed, and the operand fetch is performed only after all the preceding instructions have been completed.

The EITs detected in the OF stage 37 include a bus access exception, an address conversion exception, and a debugging trap generated by a break point hit to the operand prefetch. When the F code 44 indicates an EIT other than the debugging trap, it is transferred to the S code 46, and no operand prefetch is performed. When the F code 44 specifies a debugging trap, the same processing as the case where no EIF is indicated for that F code 44 is performed, and the debugging trap is transmitted to the S code 46.

(2.2.6) "Execution Stage"

The execution stage (E stage) 35 operates with the E code 45 and the S code 46 taken as inputs. This E stage 35 is a stage for executing instructions, and the whole processings performed in the stages before and in the F stage 34 are pre-processings for the E stage 35. In the case where a jump instruction is executed in the E stage 35 or the EIT processing is started, all the processings from the IF stage 31 to the F stage 34 are disabled. The E stage 35 is controlled by microprograms, and the instruction is executed by executing a series of microprograms starting with the entry address of microprogram indicated in the R code 43.

Read of the micro ROM and execution of the microinstruction are performed in a pipeline manner Accordingly, in the case where a branch takes place in the microprogram, a gap (blank) of one microstep is generated. The E stage 35 can also perform pipeline processing of an operand store of four bytes or less and the following microinstruction execution by utilizing the store buffer in the data operation unit 56.

In the E stage 35, the write reserve to the register and the memory performed in the A stage 33 is released after write of the operand.

In the case where a conditional branch instruction generates a branch in the E stage 35, the branch prediction for that conditional branch instruction has been wrong, and therefore rewriting of the branch history is performed.

The EITs detected in the E stage 35 include bus access exception, address conversion exception, debugging trap, odd address jump trap, reserve function exception, wrong operand exception, reserve stack format exception, zero division trap, unconditional trap, conditional trap, delay context trap, external interruption, delay interruption, reset interruption and system faults.

The EITs detected in the E stage 35 are all EIT-processed, but the EITs which are detected between the IF stage 32 and the F stage 34 before the E stage and are reflected in the R code 43 or the S code 46 are not necessarily EIT-processed. All the EITs which are detected among from the IF stage 31 to the F stage 34, but do not reach the E stage 35 because the preceding instruction has executed a jump instruction in the E stage 35 or the like are all canceled. The instruction having caused that EIT is assumed to have not been executed from the beginning.

The external interruption and the delay interruption are accepted directly to the E stage 35 at a pause of the instruction, and necessary processing is executed by microprograms. Processings of other various EITs are performed by microprogams.

(2.3) "Status Control of Each Pipeline Stage"

Each stage of the pipeline has an input latch and an output latch, and is based on operation independent of other stages. Each stage starts the next processing after such whole processes as the one-preceding processing has been complete, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

It is required that all input signals are prepared at a timing with one clock before the operation start in each stage. If the input signals are not all prepared, that stage is put in the waiting state (input waiting). If transfer from the output latch to the input latch of the next stage is done, it is required that the input latch of the next stage is in the empty state, and when the input latch of the next stage is not empty, the pipeline stage is also put in the waiting state (output waiting). If the required memory access right cannot be acquired, or wait is inserted into the memory access under processing, or another pipeline conflict occurs, the processing itself of each stage is delayed.

(3) "Processing of Branch Instruction"

As mentioned above, since the data processor related to the invention is provided with multistage pipeline processing mechanism, overhead is applied when executing branch instruction. To minimize the overhead, the data processor related to the invention executes dynamic branch prediction processing, which is intended to access to the branch instruction as early as possible by branching the instruction at the decoding stage instead of accessing to the branch instruction at the instruction execution stage. Generally, not only the data processor related to the invention, but any conventional data processor also frequently executes the branch instruction, and taking this into consideration, the invention significantly promotes overall performance characteristic of the data processor by virtue of the dynamic branch prediction processing.

(3.1) "Kinds of Branch Instructions"

The preferred embodiment of the data processor related to the invention calls the instruction executing dynamic branch prediction processing "pre-branch instruction". This includes such an instruction which compulsorily branches itself despite application of dynamic prediction such as the unconditional branch instruction.

The branch instruction provides for the data processor related to the invention is classified into four kinds according to the property of branch condition whether it is static or dynamic and also whether the branch target is static or dynamic. In this preferred embodiment, the following two kinds of these instructions are called to be the "pre-branch instructions".

The first kind of the branch instruction is the one with the branch condition and the branch target are static in property. This kind of instruction includes unconditional branch instruction (BRA) and subroutine calling instruction (BSR). The second kind of the branch instruction has branch condition which is dynamic, although the branch target is static in property. This kind of instruction includes conditional branch instruction (Bcc) and loop control instruction (ACB).

(3.2) "Functional Configuration of the Branch Instruction Processing Circuit"

Figure 5:
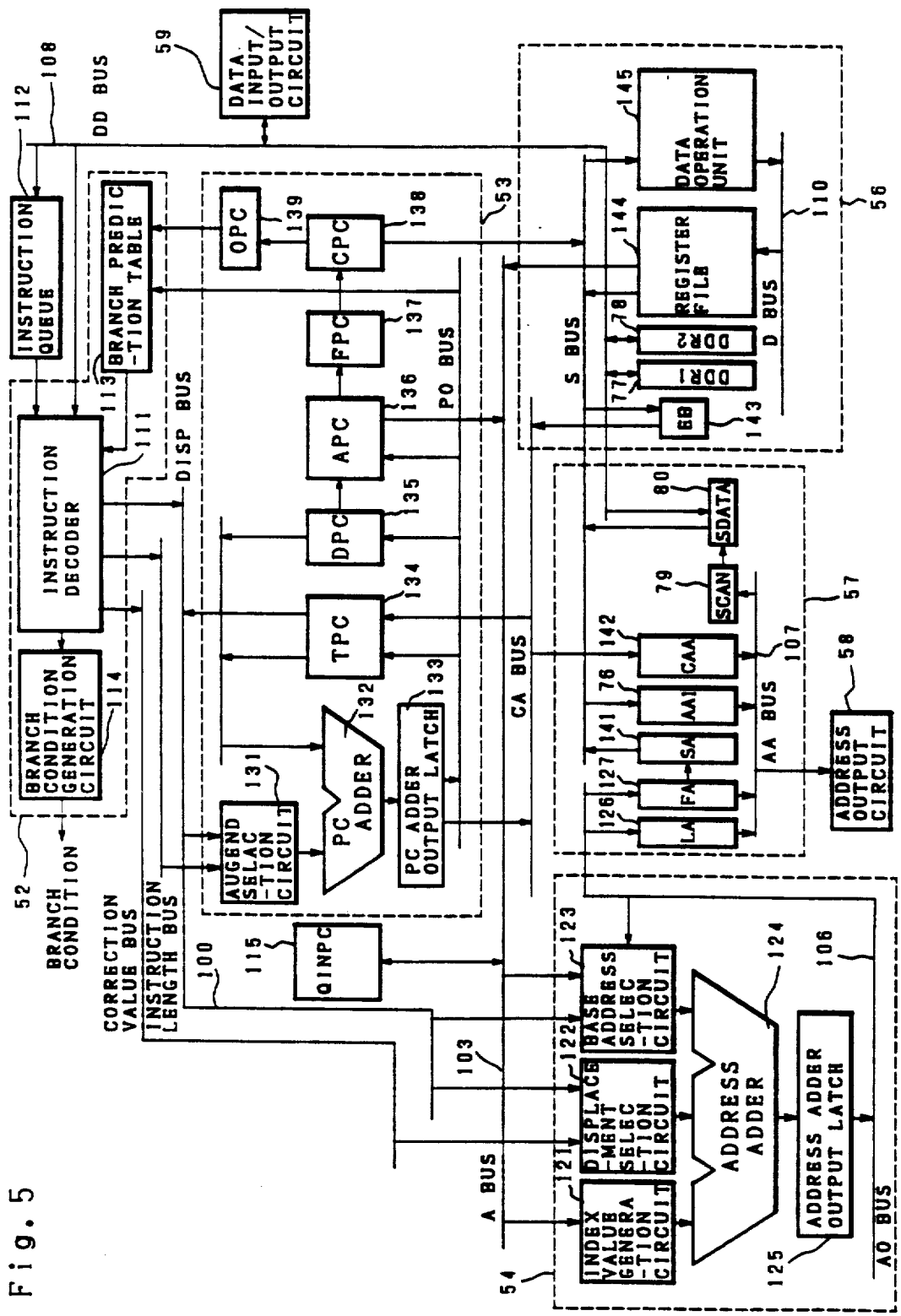
FIG. 5 is a detailed block diagram showing a configuration of a branch instruction processing circuit of the data processor related to the invention.

FIG. 5 represents the detailed block diagram of the branch instruction processing circuit of the data processor of the invention.

FIG. 5 includes an address output circuit 58, a data input circuit 59, and partially detailed views of circuits provided in an instruction fetch unit 51, an instruction decoding unit 52, a PC (program counter) calculation unit 53, an operand address calculation unit 54, a data operation unit 56, and an external bus interface unit 57, respectively.

An instruction decoder 111 and input side of a PC adder 132, input side of an address adder 124 are connected to each other via a DISP bus 100 which transfers the displacement value and the displacement value of branch instruction. The instruction decoder 111 and input side of the address adder 124 are also connected to each other via a correction value bus 101 which transfers the length of a instruction code available for generating step codes and predecremented value under the stack push mode. The instruction decoder 111 and input side of the PC adder 132 are also connected to each other via the instruction length bus 101 which transfers the length of instruction code available for generating step code. A register file 144 and input side of the address adder 124 are connected to each other via an A bus 103 which transfers address value stored in the register file 144.

An instruction code from an instruction queue 112 is inputted to the instruction decoder 111, and branch prediction bit from a branch prediction table 113 is inputted to the same. Depending on the result of branch prediction, a branch condition generating circuit 114 which is provided for the output part of the instruction decoder 111 and determines whether the branch condition designated field of the conditional branch instruction should directly be outputted to the E stage 35 or it should be outputted with inverting the specified condition.

An augend value selection circuit 131 selectively receives either of the value of the instruction length bus 101 or the value of the DISP bus 100. A DPC 135 keeps a PV value of an instruction decoded by the D stage 32. A TPC 134 keeps a working PC value at the boundary of step codes. The PC adder 132 receives signal from the augend value selection circuit 131 and from either the DPC 135 or the TPC 134. Output of the PC adder 132 is delivered to a CA bus 104 and a PO bus 105 via a PC adder output latch 133. The PO bus 105 is also connected to a latch TPC 134, latch DPC 135, latch APC 136 which keeps the PC value of the instruction being processed by the A stage 33, and branch prediction table 113. To input new instruction addresses when branching or jumping occur in stage 35, the TPC 134 is provided with another input route connected to the CA bus 103.

Output from a correction value bus 102 and DISP bus 100 are inputted to a displacement selection circuit 122, and then, either of those outposts is inputted to the address adder 124. Output from DISP bus 100 and A bus 103 are inputted to a base address selection circuit 123, and then, either of those outputs is inputted to the address adder 124. The address adder 124 executes ternary addition with an output of the displacement selection circuit 122, the base address selection circuit 123 and the index value generating circuit 121 which makes value being input from the A bus 103 values of equivalent, double, four times, and eight times by shifting as the input. Output value of the address adder 124 is outputted to an AO bus 106 via address adder output latch 125. The AO bus 106 is connected to a latch IA 126 and a latch FA 127, where the latch IA 126 keeps such address value when address output circuit 58 outputs address value to external of CPU via an AA bus 107 at executing memory indirect addressing, whereas the latch FA 127 keeps operand address when the address output circuit 58 outputs operand address value to external of CPU via the AA bus 107 at prefetching operand in stage.

The latch FA 127 has an output route connected to a latch SA 141 which keeps the operand address added up by the address adder 124 in order to use the operand address at the E stage 35. The latch SA 141 has an output route connected to an S bus 109 which is the general purpose data bus of data operation unit 56. The CA bus 104 transferring address of instruction is connected to the following elements; A PC adder output latch 133, a TPC 134, a counter QINPC 115 which controls addresses of instruction codes prefetched by the instruction fetch unit 51, a latch CAA 142 which keeps value of address required for fetching instructions when the addresses output circuit 58 outputs this address to external of CPU via the AA bus 107, and a latch EB 143 which receives new instruction address from the S bus 109 when either branching or jumping occurs in the E stage 35. A APC 136 has outputs route connected to the A bus 103 and a latch FPC 137 which keeps the PC value of instruction being processed at the F stage 34. The FPC 137 has an output route connected to latch CPC 138 which keeps the PC value of instruction being processed at the E stage 35. The CPC 138 has output routes connected to the S bus 109 and a latch OPC 139 which keeps the value of the least significant byte of the PC value available for rewriting the branch history. The register file 144 is composed of general purpose register and working register and has output routes connected to the S bus 109 and the A bus 103, and an input route connected to the D bus 110. A data calculator 145, which is a calculating mechanism of the data operation unit 56, has an input route connected to the S bus 109 and an output route connected to the D bus 110.

(3.3) "Method of Branch Prediction"

The data processor related to the invention securely predicts that of the unconditional branch instruction (BRA), subroutine branch instruction (BSR), and loop control instruction (ACB) branch in spite of the value of the branch prediction bit being outputted from the branch prediction table. The data processor always correctly predicts that unconditional branch instruction BRA and subroutine branch instruction (BSR) branch.

By adding up the value designated as the loop control variable, ACB instruction identifies whether the result of the addition satisfies the loop terminating condition, or not. When it is not satisfied, branching is executed. When it is satisfied, then no branching is executed. As a result, in conjunction with the ACB instruction, this mechanism correctly predicts covering a majority of software with high probability. Programmers can prepare more efficient programs by fully utilizing characteristic features of the function of data processor related to the invention in dealing with ACB instruction than preparing programs without being aware of such advantageous features.

When processing Bcc instruction, the CPU identifies whether this instruction should be branched or not with reference to the past branch history. Review of the past branch history is executed by referring to address of the lower 8 bits of the address of the instruction executed immediately before the execution of Bcc instruction. Branch prediction is executed by referring to one time of the past branch history and the branch prediction is shown by one bit.

(3.4) "Configuration of Branch Prediction Table"

FIG. 6 represents the detail of instruction branch prediction table 113.

7 bits output from the PO bus 105 and 7 bits output from the OPC 139 are inputted to a decoder 152 via a selector 151. The decoder 152 decodes 7 bits into 128 bits, and then outputs one of these 128 bits of the branch history latch 153 to the branch prediction output latch 154 via a branch prediction signal line 161. On receipt of a clearance signal 157, all the 128 bits of the branch history latch 153 reset all values and designate that "no branching is executed". The branch prediction output latch 154 is connected to the branch prediction renewal circuit 156 with inverting the content by a branch prediction inversion circuit whether this instruction should be branched or not with reference 155. The branch history latch 153 receives a branch prediction control signal 160 which is a write enable signal of the branch history latch 153. While this signal keeps "L", no data can be written into the branch history latch 153. A branch prediction signal 161 constitutes AND together with the branch prediction control signal 160 to deliver it to a branch prediction output latch 154. As a result, while the branch prediction control signal 160 keeps "L", it is constantly predicts that "no instruction will be branched".

Using the lower 8 bits of the address of instruction decoded by the D stage 32 immediately before the one decoded by the D stage 32 and in reference to the branch prediction table 113 mentioned above, the data processor related to the invention securely predicts the branching of specified instructions. By referring to the past one history, branch prediction is registered by direct mapping system. Since the least significant bit (shown to the right of FIG. 6) of the instruction address is constantly zero, the data processor related to the invention constitutes the branch prediction table using 128 bits.

Only when the Bcc instruction is decoded, branch prediction bit is effectively used. Independent of the needs for use, the branch prediction bit is inputted to the instruction decoder 111 together with instruct on codes of all instructions. Reference to the branch prediction table 113 is executed by applying the lower 1 byte (where the least significant bit is unnecessary) of the PC value of the in adder 132 when the instruction immediately before the above one is decoded. This allows the branch prediction bit to be inputted into the instruction decoder 111 before D stage starts the following process.

Initial value of branch history of the branch prediction table 113 is totally changed as "no branching is executed" by applying the clearance signal 157. When the Bcc instruction branches at the E stage 35, branch prediction is renewed. In the case where the Bcc instruction branches at the stage 35, it means that branch prediction at the D stage 32 is incorrect. When this occurs, the E stage 35 renews branch prediction by inverting the incorrectly branch history at the E stage. The E stage 35 transfers the content of OPC 139 to the decoder 152. Using the decoded result of OPC 139, the content of the corresponding bit of the branch history latch 153 is read into the be branch prediction output latch 154. The branch prediction renewal latch 156 having the inverted content of the branch prediction output latch 154 is then rewritten into branch history latch 153 which is designated by the value of the OPC 139.

Since branch prediction is executed in accordance with the PC value of the instruction decoded immediately before Bcc instruction to be an object is decode, renewal of the branch prediction table 113 is also executed in accordance with the PC value of the instruction executed by the E stage 35 immediately before executing the Bcc instruction. To achieve this, the E stage 35 is provided with the OPC 139 which stores the lower 1 byte (where the least significant bit is unnecessary) of the PC value of the instruction executed immediately before the instruction under processing.

Using the lower 1 byte of the PC value mentioned above, the branch prediction table 113 is renewed. Branch history is renewed only when the Bcc instruction branches at the E stag 35 and thus, reference to branch prediction table 113 of the D stage 32 is not disturbed by the renewal of the branch history executed by the E stage 35. Immediately after the branching of instruction occurs in the E stage 35, the D stage 32 waits for the arrival of the instruction code from the IF stage 31. The branch history is rewritten while the D stage 32 waits for the arrival of the instruction code from the IF stage 31.

When no prediction is executed for branch instruction, the value of branch prediction control signal 160 keeps "L". The branch prediction signal 161 constitutes AND together with branch prediction control signal 160, and then, is outputted to branch prediction output latch 154. This allows the mechanism to constantly predict that no branching will be executed. Since the branch prediction control signal 160 controls operation of the branch history latch 152 for writing the branch history, no branch history can be written into to branch history latch 153.

(3.5) "Operation of PC Calculation Unit"

When an instruction code is decoded at the D stage 32, in reference to the data related to the length of instruction code decoded one time before and in reference to the head address of the instruction code decoded one time before, the PC calculation unit calculates the head address of instruction code being decoded. The PC calculation unit allows the DPC 135 to keep the PC value, i.e., the address of the boundary of the instructions, and allows the TPC 134 to @control the address of the boundary of step code. The content of DPC 135 is rewritten only when the address of the boundary of the instruction is calculated. The content of TPC is rewritten per every addresses at the boundary of step codes, i.e., whenever the instruction is decoded. Since the PC value of the step code processed by pipeline is needed for the PC value of the source instruction of the step codes, the PC value is transferred to DPC 135 and FPC 138.

As mentioned in paragraph (3.1.2), instruction is decoded per step code. Zero through six bytes of instruction codes are consumed per one decoding. The length of instruction code used when identifying each instruction decoding is outputted from the instruction decoder 111 to the instruction length bus 101.

When no pre-branching is executed, the D stage 32 decodes the following instruction, and simultaneously, in order to calculate the PC value of the following instruction at the PC calculation unit 53, D stage 32 adds the value of TPC 134 to the length of instruction code consumed for decoding after delivery from instruction length bus 101, and then writes the result of the addition into the TPC 134. Concretely, the head address of one step code is calculated when the step code is generated by decoding process.

Since instruction codes to be decoded are sequentially outputted from instruction queue 112 except for the time of pre-branching, there is no need of knowing the head address of the instruction codes at the beginning of decoding operation. When the step code generated by the D stage 32 is the last step code of instruction A, output from the PC calculator 132 calculated under decoding the following instruction B constitutes the head address of instruction B and also the PC value of instruction B, and as a result, PC value of instruction B as the output from the PC calculator 132 is written into the TPC 134 and DPC 135 via the PO bus 105. In the case where the A stage waits for an output code which is urgently required for the APC 136, the PC value of instruction B is also written into the APC 136 via the PO bus 105.

When executing pre-branching of instructions, after transmitting the last step code of the pre-branch instruction code, the D stage 32 stops operation of the instruction decoder 111 and calculates the PC value of branch target instruction by adding the value of the DPC 135 to the branch displacement transferred from the DISP bus 100. Then, the D stage 32 delivers initialization instruction to the IF stage 31, writes the PC value of the branch instruction as the result of the addition into the TPC 134 and DPC 135, and also writes the PC value of the branch instruction into the QINPC 115 and CAA 142 via the CA bus 104.

The D stage 32 detects the odd number address jump trap while calculating branch target instruction address by pre-branching, and then designates the calculated result in the D code 41 as parameter. It is judged that the pre-branching is correct, the E stage 35 activates the odd number address jump trap. When pre-branching is incorrect and branching is executed at the E stage 35 again, odd number address jump trap is ignored. So the odd number address jump trap detected by the D stage 32 is processed independent of other EITs. To activate odd number address jump trap, the E stage 35 necessitates odd value of instruction address. To suffice this, when detecting odd number address jump trap, the D stage 32 generates a specific step code (OAJT step code) having PC value which is composed of an odd address value. The A stage 33 and F stage 34 transmit the OAJT step code to the following stages, respectively. When the CPU judges that the pre-branching is correct and when the odd number address jump trap is detected in the pre-branching, the E stage 35 then activates the odd number address jump trap by using the PC value of the next OAJT step code transferred through CPC 138.

When branching is executed at the E stage 35, branch target address is transferred from the EB 143 to the TPC 134 via the CA bus 104. The PC calculation unit 53 adds the value of branch target address to zero, and then writes the addup result into the TPC 134 and the DPC 135 via the PO bus 105. The initialization of PC calculation unit 53 is completed, where the initialization overlaps the initial unit decoding when branching occurs in the E stage 35. When delivering values to the TPC 134 from the CA bus 104, identical values are set to the PINPC 115 and CAA 142.

(3.7) "Operation of Operand Address Calculation Unit for Pre-Branch Instruction"

When the D stage 32 does not execute pre-branching for the pre-branch instruction, the operand address calculation unit 54 calculates branch target address of the pre-branch instruction. The address adder 124 calculates branch target address by adding the value of APC 136 transferred from the A bus 103 to the value of branch displacement delivered from the DISP bus 100. The calculated branch target address is delivered to the E stage 35. When the A stage 33 calculates branch target address using operand address calculation unit 54, detection of the odd number address jump trap is not executed. Since the branch target address transferred to the E stage 35 is an odd number, information of the odd number address jump trap is delivered to the E stage 35.

When the D stage 32 processes pre-branching, to deal with Bcc and ACB instructions, the A stage 33 calculates the PC value of the following instruction being present in the address following the pre-branched instruction. The calculation result is delivered to the E stage 35 so that the result is used again for the branch target address when the pre-branching is incorrect. To deal with those instructions like the Bcc instruction which should be decoded into one step code by the D stage 32, this stage 32 adds the instruction length of Bcc instruction delivered from the correction value bus 102 to the value of APC 136 transferred from the A bus 104, and then the result of the addition is written into the FA 127 via the AO bus 106.

(4) "Operand Bypass Mechanism"

Figure 7:
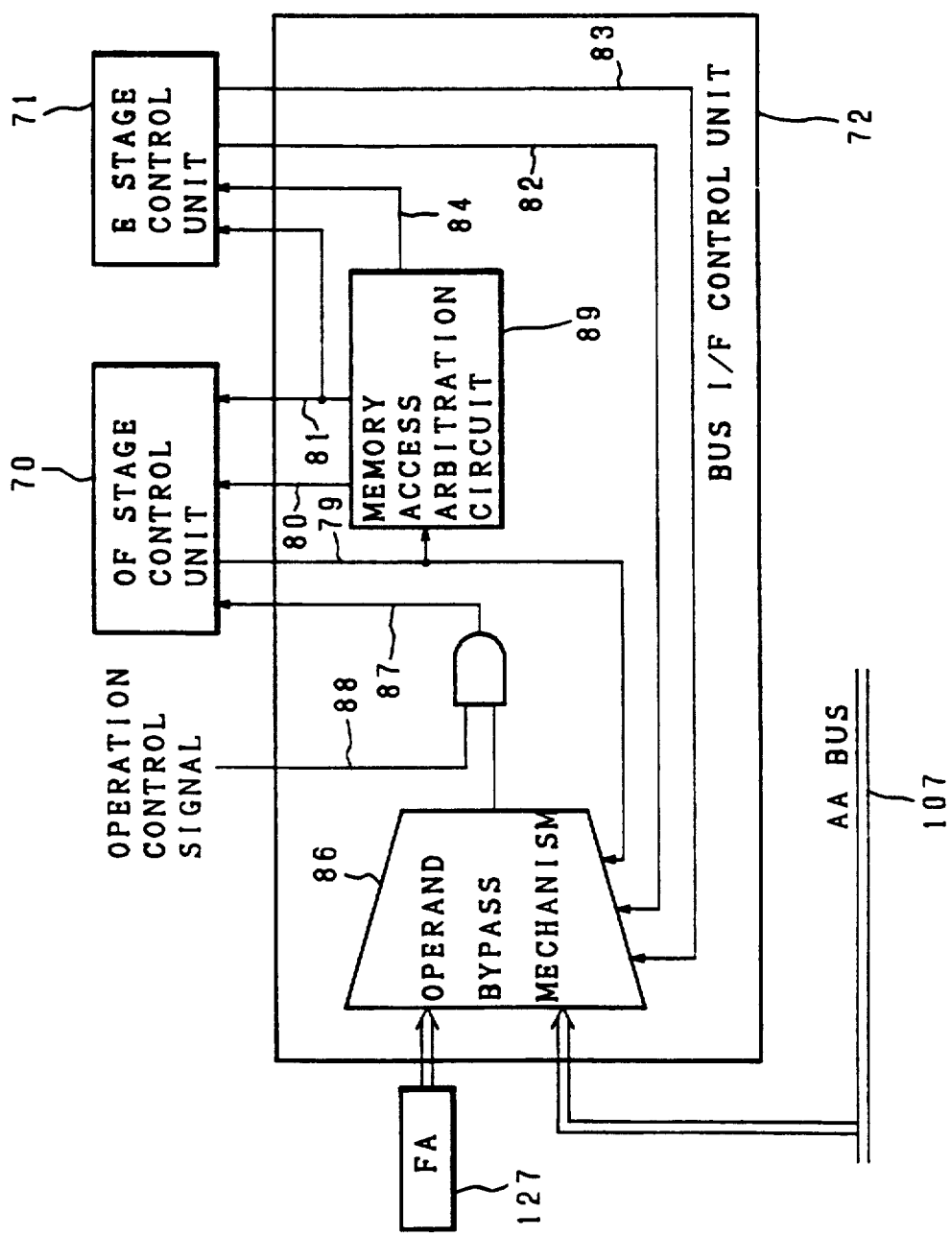
FIG. 7 is a schematic block diagram of a bus interface control unit and peripheral circuits of the data processor related to the invention.

FIG. 7 is the schematic block diagram of the external bus interface controller and peripheral circuits.

FIG. 7 illustrates the following elements: OF stage control unit 70, E stage control unit 71, external bus interface control unit 72, access request signal 79 from OF stage control unit, access request acceptance signal 80 which is delivered to OF stage control unit, access completion signal 81, access request signal 82 from E state control unit 82, signal 83 designating whether the access request signal from E stage control unit is read or write, access request acceptance signal 84 which is delivered to E stage control unit, operand bypass mechanism 86, bypass enable signal 87 outputted from operand bypass mechanism, control signal 88 controlling operation of operand bypass mechanism, and memory access arbitration circuit 89.

Referring now to FIG. 5 and FIG. 7, operand bypass processing is described below.

The external bus interface control unit 72 accepts the bus access request signal from respective stages of pipeline processing mechanism and exchanges data with memory external of CPU. When the OF stage control unit 70 prefetches operand from external memory, first, the OF stage control unit 70 sets an address in the FA register 127 and outputs the access request signal 79 to the external bus interface control unit 72. When neither of memory is being accessed and no access request signal is delivered from the E stage control unit 71, the external bus interface control unit 72 outputs access request acceptance signal 80 to OF stage control unit 70. As soon as memory accessing operation is completed, the external bus interface control unit 72 delivers access completion signal 81 to the OF stage control unit 70. The value of AA bus 107 used for accessing memory is delivered to the SCAM 79, while data in the DD bus 108 is delivered to the SDATA 80. When data accessing operation is executed across word boundary, accessing operation is executed twice, while data needed for implementing accessing operation is directly inputted to the SDATA 80. Simultaneously, addresses in the AA bus 107 used for every data accessing operation are directly inputted to the SCAM 79. The data thus inputted into the SDATA 80 are then transmitted to the calculation unit 56 via the S bus 109.

When the E stage control unit 71 reads data from memory external of CPU, first, the E stage control unit 71 sets address to the AA1 register 76, and then outputs the access request signal 79 and read/write signal 73 in the state of read to the external bus interface control unit 72. As soon as the external bus interface control unit 72 accepts the access request signal from the E stage control unit 71, the external bus interface control unit 72 outputs the access request acceptance signal 84 to the E stage control unit 71. When memory accessing operation is completed, the external bus interface control unit 72 outputs the access completion signal 81 to the E stage control unit 71. Data in the DD bus 108 is fetched into the DDR1 register 77.

When the E stage control unit 71 writes data into memory external of CPU, the E stage control unit 71 sets designated address to the AA1 register 76 and data to the DDR2 register 78, and finally outputs the access request signal 82 to the external bus interface controller 72 together with the read/write signal 83 in the state of write. On acceptance of the access request, the external bus interface controller 72 outputs the access request acceptance signal 84 to the E stage control unit 71. When memory accessing operation is completed, the external bus interface control unit 72 returns the access completion signal 81 to the E stage control unit 71.

When access requests from the E stage control unit 71 and OF stage control unit 70 are simultaneously generated, the external bus interface control unit 72 preferentially accepts the access request from the E stage control unit 71.

When write access request from the E stage control unit 71 and access request from the OF stage control unit 70 are simultaneously generated and yet both addresses are identical, data is read on request of the OF stage control unit 70 immediately after writing this data on request of the E stage control unit 71, thus causing the external bus access to become redundant by one time.

To prevent this, the operand bypass mechanism 86 is provided, which constantly compares the value of AA bus 107 to the value of FA register 75 and outputs a bypass enable signal 87 in the event when those values were identical and access requests from the OF stage control unit 70 and E stage control unit 71 are simultaneously generated. From the viewpoint of the OF stage control unit 70, the bypass enable signal 87 has the same meaning as that of the access request acceptance signal 80. When the access completion signal 81 is generated, it indicates that accessing of memory from the E stage control unit 71 and OF stage control unit 70 are completed, thus allowing address in the AA bus 107 and data in the DD bus 108 to be inputted to the SCAM 79 and SDATA 80, respectively.

When operating the operand bypass mechanism 86 by constituting AND with signal from operand bypass mechanism 86 and the operand bypass operation control signal 88, output from the operand bypass mechanism 86 is directly inputted to the OF stage control unit 70. Conversely, when the operand bypass mechanism 86 remains inoperative, bypass is constantly inhibited.

In the event when data is written into the same address as that of the data stored in the SDATA 80 acting on the request for the data writing from the E stage control unit 71 before the data calculation unit 56 uses those data present in the SDATA 80, data in the SDATA 80 can be rewritten by operation of the SCAM 79 for detecting coincidence of operand addresses, thus maintaining data to be consistent.

(5) "Controlling of Branch Prediction Mechanism and Operand Bypass Mechanism by Control Register"

The data processor related to the invention is provided with a control register which controls operations of the branch prediction mechanism and the operand bypass mechanism. FIG. 8(a) and FIG. 8(b) respectively show the configuration of the control register used for this embodiment.

Operation of branch prediction mechanism is controlled by an M bit of the register BBC shown in FIG. 8(a). The branch prediction mechanism is kept inactivated with M×0 and activates while M=1. The M bit becomes the control signal 160 for controlling operation of branch prediction mechanism.

A B bit of the BBC register controls operation of the operand bypass mechanism. The operand bypass mechanism is kept inactivated while B=0 and activates while B=1. The B bit becomes the control signal 88 for controlling operation of the operand bypass mechanism.

A P bit of the register BBP shown in FIG. 8(b) clears branch history by writing "1" into the P bit itself. Note that the BBP register is used only for writing data, while this register is not provided with function to keep data value at all. Operation for writing data into the BBP register generates a specific signal which directly controls any operation. Even if reading is executed for the register BBC, no data but "0" is constantly read out. The write signal for the P bit becomes the clearance signal 157 for use with branch prediction mechanism.

The control bit cited above is allowed to be present in the independent control registers or in a commonly usable control register. Operations of the branch prediction mechanism and operand bypass mechanism can properly be controlled by setting/resetting adequate control bit present in the control register.

Entry of values into these registers is executed by an LDC instruction which is the instruction for loading values in specially usable registers.

Environment in the execution of program is variable by execution of such a specific instruction used for switching task or process like an LDCTX instruction, i.e., instruction for loading context. When this occurs, branch history becomes totally unreliable. To prevent this, the data processor related to the invention automatically generates the clearance signal 157 which is available for branch prediction mechanism in the event when such a specific instruction varying the program executing environment were executed.

The preferred embodiment of the present invention clears whole bits for clearing branch history at one tome. Alternatively, it is also allowable to arbitrarily set values of respective bits for designating branch history.

As is clear from the above description, the data processor related to the invention securely improves the data processing efficiency by prohibiting all the operations of branch prediction mechanism by setting the predetermined value to the control register in the event when the operation of the branch prediction mechanism adversely lowers data processing efficiency. As a result, when following up the flow of instructions by monitoring external address bus for example, flow of instructions can easily be detected merely by setting a predetermined value into the control register to inhibit operation of branch prediction mechanism. Also, even when the reliability of branch history lowers as a result of varied condition of the running program, branch history is cleared by writing a predetermined address into the control register, thus preventing the reliability of the branch history from adversely being affected. Furthermore, even when context switching instruction varying the program executing condition were executed for example, branch history is automatically cleared.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A pipeline processor having a series of processing stages for processing a set of instructions, the processor comprising:

means for detecting a conditional branch instruction;

means for selectively predicting either one of satisfaction or non-satisfaction of a prescribed condition of said conditional branch instruction prior to execution of said conditional branch instruction; and means for controlling the selectivity of said predicting means, said controlling means having a first state and a second state, said controlling means during said first state enabling said predicting means to predict whether said condition is satisfied, said controlling means during said second state disabling said predicting means to preclude prediction of whether said prediction is satisfied; and wherein the state of said controlling means is defined by an instruction to be either one of said first state or said second state.

2. The processor of claim 1 further comprising a branch history table for storing a branch history of conditional branch instructions, said predicting means accessing said branch history table during said first state to predict whether said condition is satisfied.

3. The processor of claim 2 in which said branch history table is cleared in response to a change in a program executing condition.

4. A pipeline processor having a series of processing stages for processing a set of instructions, the processor comprising means for detecting a conditional branch instruction;

means for selectively predicting either one of satisfaction or non-satisfaction of a prescribed condition of said conditional branch instruction prior to execution of said conditional branch instruction;

means for controlling the selectivity of said predicting means, said controlling means having a first state and a second state, said controlling means during said first state enabling said predicting means to predict whether said condition is satisfied, said controlling means during said second state disabling said predicting means to preclude prediction of whether said prediction is satisfied; and a branch history table for storing a branch history of conditional branch instructions, said predicting means accessing said branch history table during said first state to predict whether said condition is satisfied.

5. The processor of claim 4 in which the state of said controlling means is defined by an instruction to be either one of said first state or said second state.

6. The processor of claim 5 in which said branch history table is cleared in response to a change in a program executing condition.

7. The data processor of claim 4 wherein said branch history table stores prespecified prediction values which are all false and that a desired prespecified pattern indicates no branch prediction such that said branch prediction means predicts processing in a particular order when in said first state.

* * * * *